United States Patent
Gelgon et al.

(10) Patent No.: US 6,810,521 B1
(45) Date of Patent: Oct. 26, 2004

(54) PROTOCOL FOR INTERNAL EXCHANGE OF DATA BETWEEN APPLICATIONS OF A PORTABLE MULTI-APPLICATION OBJECT AND CORRESPONDING PORTABLE MULTI-APPLICATION OBJECT

(75) Inventors: Sébastien Gelgon, Bois d'Arcy (FR); Stéphane Overt, Beynes (FR)

(73) Assignee: Bull, CP8, Louveciennes (FR)

( * ) Notice: Subject to any disclaimer, the term of this patent is extended or adjusted under 35 U.S.C. 154(b) by 0 days.

(21) Appl. No.: 09/581,072

(22) PCT Filed: Oct. 7, 1999

(86) PCT No.: PCT/FR99/02404

§ 371 (c)(1),
(2), (4) Date: Jun. 9, 2000

(87) PCT Pub. No.: WO00/22525

PCT Pub. Date: Apr. 20, 2000

(30) Foreign Application Priority Data

Oct. 9, 1998 (FR) .............................. 98 12650

(51) Int. Cl.$^7$ ................................. G06F 9/54
(52) U.S. Cl. ................... 719/313; 710/11; 235/380; 709/230
(58) Field of Search ................. 709/310–320, 709/328–330, 230–237; 711/170–173, 200–208; 713/200–202; 719/310–320, 328–330; 235/380–382, 382.5; 710/11–13

(56) References Cited

U.S. PATENT DOCUMENTS

| | | | | |
|---|---|---|---|---|
| 5,212,369 A | * | 5/1993 | Karlisch et al. ............. | 235/380 |
| 5,802,519 A | * | 9/1998 | De Jong ..................... | 707/100 |
| 5,822,784 A | * | 10/1998 | Garney ....................... | 711/208 |
| 5,854,891 A | * | 12/1998 | Postlewaite et al. ......... | 713/202 |
| 5,923,884 A | * | 7/1999 | Peyret et al. ............... | 717/167 |
| 5,963,980 A | * | 10/1999 | Coulier et al. .............. | 711/163 |
| 6,003,134 A | * | 12/1999 | Kuo et al. ................... | 713/200 |
| 6,052,690 A | * | 4/2000 | de Jong ....................... | 707/101 |
| 6,220,510 B1 | * | 4/2001 | Everett et al. .............. | 235/380 |
| 6,385,645 B1 | * | 5/2002 | De Jong ...................... | 709/208 |
| 6,619,554 B1 | * | 9/2003 | Vestergaard et al. ........ | 235/492 |

FOREIGN PATENT DOCUMENTS

GB 2 305 270 A 4/1997

OTHER PUBLICATIONS

Dave A et al. "Proxies, Application Interfaces, and Distributed Systems" Proceedings International Workshop on Object Orientation in Operating Systems, Jan. 1, 1992; pp. 212–220.

* cited by examiner

Primary Examiner—St. John Courtenay, III
(74) Attorney, Agent, or Firm—Miles & Stockbridge P.C.; Edward J. Kondracki

(57) ABSTRACT

The invention relates to a protocol for exchanging data between applications of a portable multi-application object, such as a microprocessor or smart card. An internal communications interface is implanted in the nonvolatile memory of the smart card. Given a message sending command and message reception command, a source application attribute (E-ID) is assigned a) to an application, and a target application attribute (R-ID) is assigned b) to at least one other application. The exchange of information messages (MSG) c) is done between source and target applications by means of the communications interface used as an intermediary. The invention is applicable to the management of portable multi-application objects, such as processor cards, PCMCIA cards, or the like.

16 Claims, 12 Drawing Sheets

| | MESSAGE MSG |
|---|---|
| DATA | CONTENTS OF THE MESSAGE |
| E_ID | IDENTIFIER OF THE SOURCE APPLICATION |
| L_ACK | LIST OF INFORMATION ON THE DESTINATION APPLICATION OF THE TYPE LID_DEST |
| N_MSG | INTERNAL SERIAL NUMBER FOR THE INTERFACE |

FIG. 3a

| | TYPE LID_Dest |
|---|---|
| ID_D | IDENTIFIER OF THE DESTINATION APPLICATION |
| S_L | STATE OF THE MESSAGE REGARDING READING BY THE DESTINATION APPLICATION=READ STATE OR NON-READ STATE |

FIG. 3b

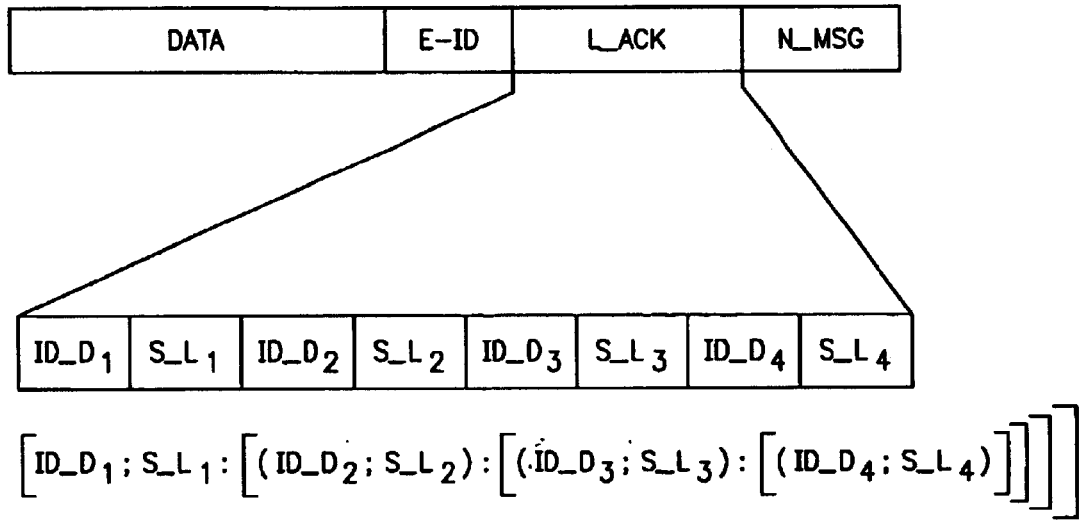

FIG. 3c

| ID_A | O_V |
|---|---|
| $ID\_A_1$ | VALID |
| $ID\_A_2$ | INVALID |
| $ID\_A_3$ | VALID |
| $ID\_A_4$ | VALID |

TAB_A

FIG. 5a

| N_MSG | ID_E | L_ACK | DATA |
|---|---|---|---|
| 38 | $ID\_A_1$ | [ ($ID\_A_3$;NL), ($ID\_A_4$;NL) ] | x x x x x x x x |

SENDING $ID\_A_1$ TO $ID\_A_2$, $ID\_A_3$, $ID\_A_4$

FIG. 5b

| N_MSG | ID_E | L_ACK | DATA |
|---|---|---|---|
| 38 | $ID\_A_1$ | ($ID\_A_3$;NL), ($ID\_A_4$;LU) | x x x x x x x x |

FIG. 5c

PROTOCOL FOR INTERNAL EXCHANGE OF DATA BETWEEN APPLICATIONS OF A PORTABLE MULTI-APPLICATION OBJECT AND CORRESPONDING PORTABLE MULTI-APPLICATION OBJECT

BACKGROUND OF THE INVENTION

1. Field of the Invention

This invention relates to make it possible to process information, such as current or smart microprocessor cards, are used in many fields.

2. Description of Related Art

To avoid vastly multiplying the number of these portable objects a user must have, engineers have implemented what is known as multi-application operating systems that achieve management of data that are intended for different uses. By way of example, the same operating system can be used to manage health applications, access to particular premises, or lending books in a library.

In general, these portable objects include various types of memories. The memory that is accessible for reading only, or ROM, contains the operating system, while the programmable memory contains the data processed by the operating system. The memory zones containing these data are quite distinct, and the operating system manages access to these zones as a function of sole conditions of access defined for each application. The functional layout of a portable object made up of a microprocessor or smart card is shown in FIG 1a.

This kind of operating mode is not possible when the portable object or smart card has to execute complex functions that are reserved solely to a specific application, such as the electronic billfold or PME application, highway toll card, or certain electronic commerce services, such as, for example buying products or merchandise by email.

In such a situation, one solution is to download the application program in the programmable memory of the card. This application program can be developed either in assembly language—in which case it can be executed directly by the microprocessor—or in high-level language, in which case it is written in the memory of the card in compressed form and then executed by an interpreter, which translates the downloaded program into instructions that can be executed by the microprocessor. This solution makes it possible to write programs in a universal language, regardless of the microprocessor with which the card is equipped.

The nonvolatile memory of the card is designed to receive applications programs of different origins. These programs can be executed independently of one another and to that have memory zones reserved to them. In certain specific cases, these programs have to communicate common data among one another. For example, an e-commerce application can use a PME application, which is resident in the memory of the card, to make one or more transactions.

In an implementation mode of the prior art described in European Patent Application filed under number 98 933 716.7 corresponding to U.S. patent application Ser. No. 09/242,976, filed Feb. 26, 1999, and assigned to the assignee of the present invention, the passage of common data can be done on the basis of a file-link that enables the transfer of common data exchanged. The method that is the subject of the aforementioned patent application describes an irreversible, permanent process that enables the communication of a set of formatted data, constituted as a file, for the relevant application; this set of data is therefore indivisible. Such data accordingly correspond essentially to working data of a particular application, these working data simply being shared by several applications independently of the implementation of these applications. While such an operative mode is satisfactory, still it does not enable the implementation of a process of dynamic exchange of information between one or more target applications.

SUMMARY OF THE INVENTION

Furthermore, the shared files are formatted as a function of these applications and can then be read or used by any external system that is compatible with them. The result is an overall lower level of security, because of the of independence or impermeability among applications.

The object of the present invention is to overcome the disadvantages of the methods in the prior art in order in particular to enable a pinpoint exchange of elementary information, in the form of information messages exchanged between a source application and one or more target applications implanted in the nonvolatile memory of a portable object, such as a microprocessor card.

Another object of the present invention is in particular the implementation of a protocol for internal exchange of information between applications of a portable object, such as a microprocessor card, this dynamic exchange being done in the form of successive messages between the applications contained in this card.

Another object of the present invention is also the implementation of a protocol for internal exchange of information between applications of a microprocessor card, making it possible to assure a high level of security and guaranteeing the confidentiality and authenticity of these messages.

Still another object of the present invention, finally, is the implementation of a protocol for internal exchange of information between applications of a portable multi-application object, such as a microprocessor card, that makes it possible to preserve the independence or impermeability among the applications of this object or card, in particular by reason of the unsuccessful nature of the temporary information conveyed by this message exchanged in pinpoint fashion between applications, unlike the information conveyed by the files exchanged by the applications in the prior art systems.

As a consequence, the present invention furnishes a protocol for internal exchange of information in a portable multi-application object provided with information processing resources, a working memory, and a nonvolatile memory, the memories being connected to these information processing resources, and an operating system being implanted in nonvolatile memory. This nonvolatile memory includes a specific memory zone for each application, each specific memory zone being subdivided into a specific memory zone for data, a specific memory zone for instructions, and a specific memory zone for identification that relate to this application.

This protocol for internal exchange of information among these applications, which given an internal communications interface provided with at least one message sending command and one message reception command that reside in the nonvolatile memory, consists at least of the following: assigning to a first application, via an identification attribute of the this first application, a source application attribute upon request for this first application to send an information message to one or more other applications; and assigning to at least one second application, which is distinct from this first application, via an identification attribute of this second application, a target application attribute upon request for this first application to send an information message to this second application. With the exchange of the information message between the first and the second application is done by sending the information message on the part of the first application and then reception of this message by the second application, by the implementation of the communications interface used as an intermediary.

The protocol that is the subject of the present invention makes it possible to assure an exchange of information between these applications while substantially preventing the risk of interaction between these applications.

BRIEF DESCRIPTION OF THE DRAWINGS

This will be better understood from reading the ensuing description and studying the accompanying drawings, introduced solely by way of example, and in which, aside from FIG. A which relates to a portable object such as a microprocessor card in the prior art.

FIGS. 3a–3c show an information message structure more particularly adapted to the implementation of the protocol that is the subject of the present invention, in a particular non-limiting embodiment;

FIGS. 5a–5c relate to an example illustrating the mode of operation of the internal communications interface according to the protocol that is the subject of the present invention.

DESCRIPTION OF THE PREFERRED EMBODIMENTS

Figure 1A:
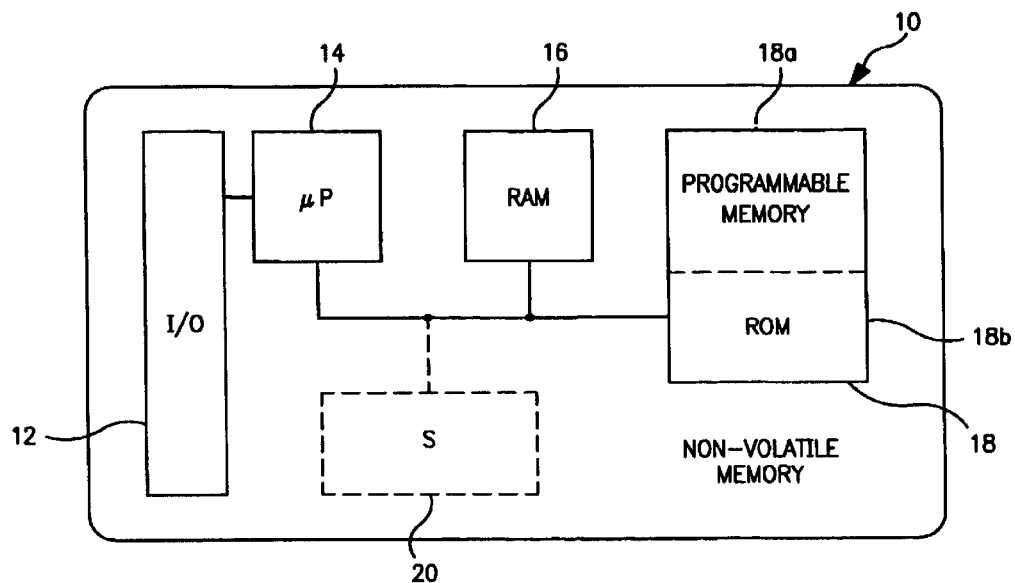
FIG. 1b shows a topography of the programmable nonvolatile memory of a portable multi-application object that makes it possible to implement the protocol that is the subject of present invention.
FIG. 1c is a general flowchart illustrating the steps that make it possible to implement the protocol that is the subject of the present invention.
Figure 1B:
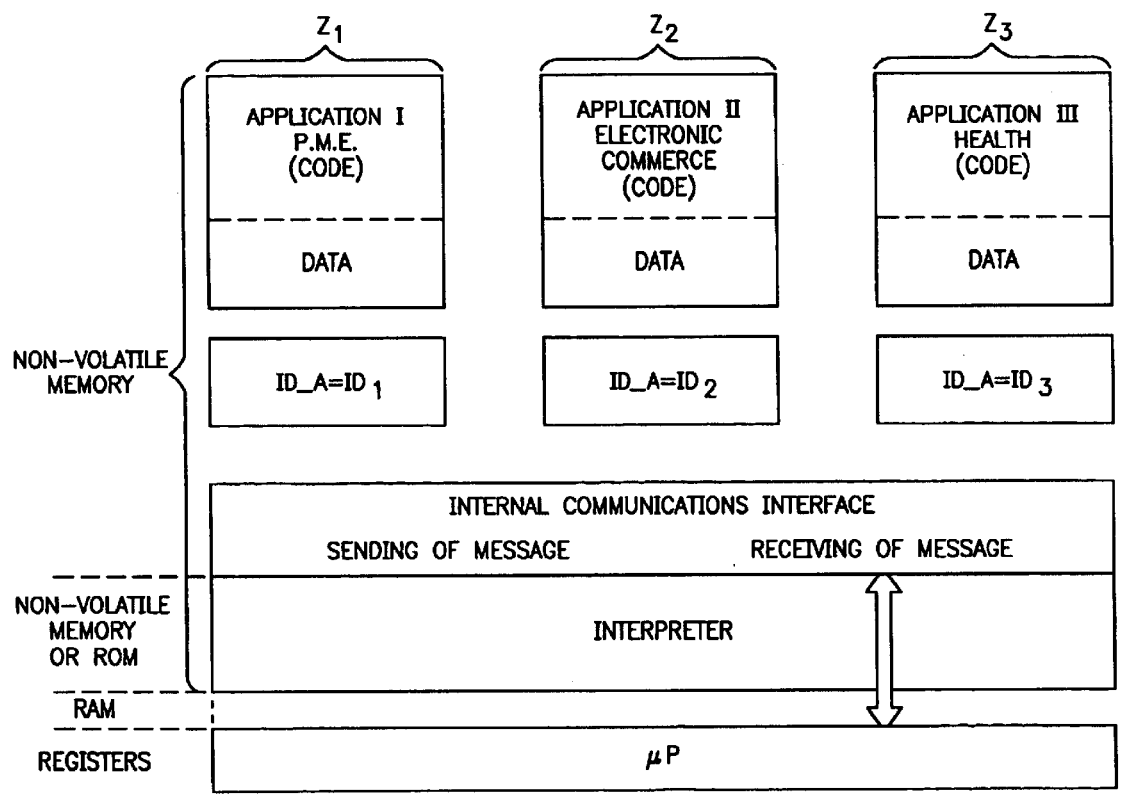
Figure 1C:
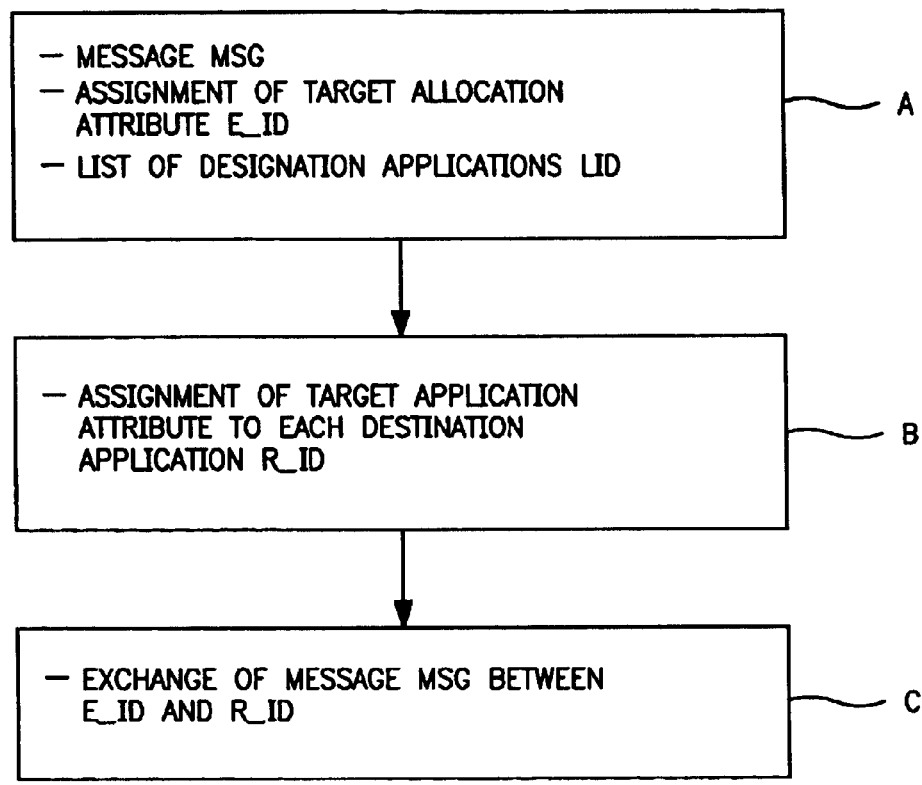

A more-detailed description of the protocol for internal exchange of information between applications of a portable multi-application object in accordance with the subject of the present invention will now be provided in conjunction with FIGS. 1a–1c and following.

In general, it will be recalled that the protocol that is the subject of the present invention can be implemented in any portable multi-application object provided with resources for information processing and exchanging information with an external terminal.

To simplify the description, the portable object that makes it possible to implement such a protocol will be presented and described as a microprocessor card, as shown in FIG. 1a; this card has the appearance of an ATM card, but this is not limiting. In particular, any other type of card, such as a card under the PCMCIA standard, for example, does not depart from the scope of the subject of the present invention.

Turning to FIG. 1, it will be recalled that the portable object, constituted by a microprocessor card and identified by reference numeral 10, conventionally includes input/output circuits marked I/O and identified by reference numeral 12, which enable communication with a terminal, such as an ATM, for example, along with information processing resources 14, constituted by a microprocessor or microcontroller, these information processing resources being connected to the input/output circuits 12. A nonvolatile memory 18 is also provided, which consists of a programmable memory $18_a$ and a ROM or read-only memory $18_b$. These two memories are connected to the microprocessor 14. Finally, a memory of the working memory type or RAM 16 is also connected to the microprocessor 14. The above links are understood to be a bus link of the conventional type.

An operating system OS is provided, which can be implanted in the nonvolatile memory 18.

Finally, and only in certain cases, the portable multi-application object can, as shown in FIG. 1a, include an enciphering/deciphering calculation unit S, identified by reference numeral 20, which in turn is connected to the microprocessor 14.

The structural elements of the portable multi-application object that is the subject of the present invention will not be described in further detail, because they correspond to known elements in the prior art.

In a variant, the microprocessor is replaced with—or at the very least supplement by—logic circuits implanted in a semiconductor chip. Such circuits are in fact capable of performing calculations, in particular authentication and signature, thanks to the hard-wired, non-microprogrammed electronics. In particular, they can be of the ASIC type (for the English term "Application Specific Integrated Circuit").

To enable implementation of the protocol that is the subject of the present invention, a specific topography of the direct access memory, and in particular of the programmable nonvolatile memory $18_a$, for example, will be described in conjunction with FIG. 1b.

As shown in this drawing figure, the programmable memory 18a includes a specific memory zone for each application, these memory zones being marked $Z_1$, $Z_2$, and $Z_3$ in FIG. 1b for each relevant application.

Each specific memory zone $Z_1$ through $Z_3$ is subdivided into a specific memory zone for data and a specific memory zone for instructions relating to the relevant application, as well as a specific memory zone for identification intended to receive an identification attribute of this application. In FIG. 1b, the identification attributes are marked $ID_1$ through $ID_3$ and are labelled ID-A.

Finally, the nonvolatile memory 18a includes a specific memory zone into which an internal communications interface is implanted; this interface consists of an object code including at least one information message sending command and one information message reception command. The aforementioned object code and the message sending and receiving codes reside in the nonvolatile memory, in a particular feature of the implementation of the protocol that is the subject of the present invention.

Finally, and in a non-limiting manner, an instruction interpreter can advantageously be implanted in nonvolatile memory 18, so as to enable the transformation of the set of applications commands into a set of instructions that can be executed directly by the microprocessor 14.

In FIG. 1b, the interfacing between the interpreter implanted in nonvolatile memory is shown, accomplished by way of the working memory RAM 16, purely for the sake of illustration; the interpreted commands can be memorized in the working memory for reciprocal access between the microprocessor 14 and the internal communications interface implanted in nonvolatile memory 18.

As also shown in FIG. 1c, the protocol that is the subject of the invention consists of assigning to a first application, by way of an identification attribute ID-A of this first application, for instance the aforementioned identification attribute $ID_1$ through $ID_3$, a source application attribute upon a request for this first application to send an information message, marked MSG, to one or more other applications. In a particular feature of the protocol that is the subject of the invention, the term "information message" is understood to mean a message comprising data or instructions, the data contained in this message being representative, after concatenation with data of the same type, of either pure data or data intended to make up the instructions that can be executed directly by the microprocessor 14 or via the interpreter. The step of assignment to the first relevant application is marked A in FIG. 1c.

In the same way, following the aforementioned step A, the protocol that is the subject of the invention consists of assigning to at least one second application, which is distinct from this first application to which a source application attribute has been assigned in step A, a target application attribute upon request for the first application to send an information message to this second application. The step of assigning the target application attribute to the second application is marked B in FIG. 1c, and the source application attributes assigned in step B and target application attributes assigned in step B are marked E-ID and R-ID, respectively.

With regard to the process of assignment of a source application attribute and a target application attribute, it is noted that this process can be achieved, by way of non-limiting example, by constituting a state vector that represents essential parameters enabling the implementation of the protocol that is the subject of the invention; this state vector includes a predetermined number of corresponding fields in which these parameters are written. This state vector can be a real vector, which can for instance be memorized in nonvolatile memory 18 and reupdated each time one of the state parameters of the latter is modified, or what is known as a virtual vector, consisting of memorization by address pointers of the corresponding parameters.

It is noted that in the implementation of the protocol that is the subject of the invention, the state vector is a real state vector, but in a preferred embodiment, this state vector, limited to specific protocol implementation parameters, as will be described hereinafter, is advantageously associated with the data of the message, to constitute a corresponding information message MSG.

In other words, regardless of the management mode of the state of the protocol that is the subject of the invention, it will be noted that the process of assigning the source or target application attributes can therefore consist of writing the identification attribute of the first or second relevant applications in the corresponding field, assigning the source and target application attributes thus resulting from this writing of this identification attribute in the proper field, and operations implemented in a process of installation-uninstallation of these applications, which will be described in further detail later in this description.

Finally, steps A and B of FIG. 1c are followed by a step C of exchanging an information message MSG, thus constituted, between the first and the second application, that is, as noted in the aforementioned drawing, between the source application E-ID and each successive target application, or destination application, marked R-ID.

The exchange process is done by sending the information message MSG on the part of the first application and then its reception on the part of each second application, thanks to the implementation of the communications interface used as an intermediary.

Figure 2A:
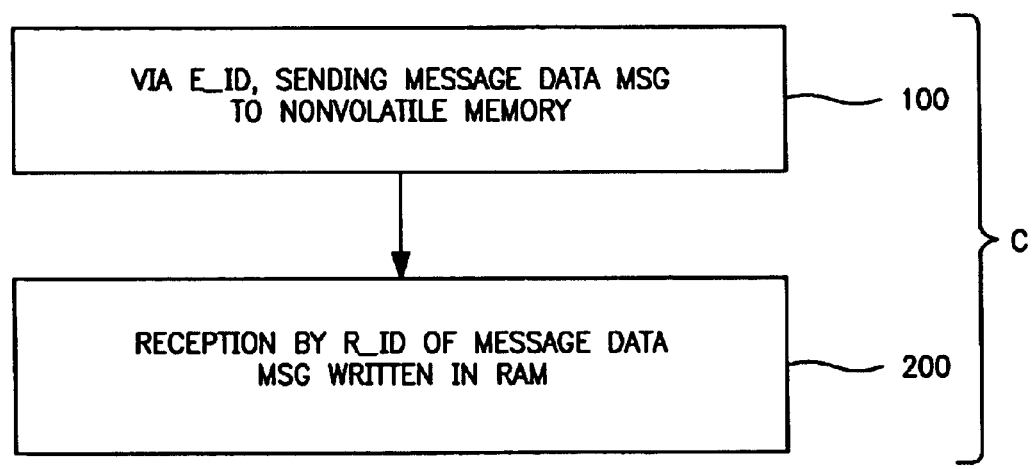
FIG. 2a is a general flowchart illustrating the step of exchanging an information method in the protocol that is the subject of the present invention, of the kind shown in FIG. 1c.

In general, the exchange step C, as shown in FIG. 2a, can consist of a step 100 for sending the information message MSG from the source application E-ID to a memory zone of the nonvolatile memory 18 by way of the aforementioned message sending command. It will appreciated in particular that sending the message MSG to the nonvolatile memory 18 is done by way of successive processing operations, which are intended to verify the operation of writing the data of the message MSG in this memory, and then the writing of this message MSG in nonvolatile memory 18, on the condition that the aforementioned processing operations have been successful. In the same way, it is understood that the exchange step further consists of a reception step 200, by the target application R-ID, of the data of the information message MSG, this reception step consisting of a series of processing steps intended to verify the execution of reading in the memory zone of the aforementioned nonvolatile memory 18, by way of the message reception command of the internal communications interface implanted in nonvolatile memory 18. It will also be understood that the aforementioned exchange step is properly achieved thanks to the communications interface used as an intermediary; as a result, the data that can be used by any target application R-ID are controlled and subjected to processing by the aforementioned internal communications interface.

For implementing the steps of sending and receiving that constitute the step of exchanging information messages in accordance with the protocol that is the subject of the invention, in a basic version, the information message MSG can include solely a field relating to the data exchanged between the source and target applications, a field relating to the number of 8-bit bytes that constitute the field relating to these data exchanged, and at least one field relating to the identifier, or identification attribute, of a target application.

Under these conditions, the step of sending message data on the part of the application E-ID to the nonvolatile memory in step 100 of FIG. 2a can consist of an instruction for the information message MSG to be written by the source application E-ID in a memory zone of the aforementioned nonvolatile memory 18. Also associated with this writing instruction is a call by the source application E-ID for the message sending command of the communications interface of the programmable memory, the effect of this call being the transmission of a transmission acknowledgement message by the communications interface to the source application E-ID.

In the same way and under the same conditions, the reception step can consist at least of a call by the target application R-ID for the message reading command of the communications interface of the nonvolatile memory. The conditions for activating the target application to perform the aforementioned call will be described later in this description.

The operative mode pertaining to these steps of sending and receiving the aforementioned information messages, as described in conjunction with FIG. 2a, provides satisfaction and enables the transmission of an information message from a given source application to a plurality of target applications unidirectionally. It will thus be understood that because of the structure of the aforementioned information messages, since the field relating to at least one identification attribute of a target application in each method is in fact constituted of a list of target application identification attributes, it is then possible, given such a list and with the target application having been active, to perform a systematic reading, in the appropriate nonvolatile memory zone, of the relevant information message, from any target application.

Nevertheless, the protocol that is the subject of the invention can be made much more flexible with respect to the process of exchanging information messages between applications.

To that end, and in accordance with non-limiting advantageous aspect thereof, a procedure or step of transmitting a message acknowledging reception of the information message MSG by the target application to the source application E-ID via the communications interface can also be provided.

Figure 2B:
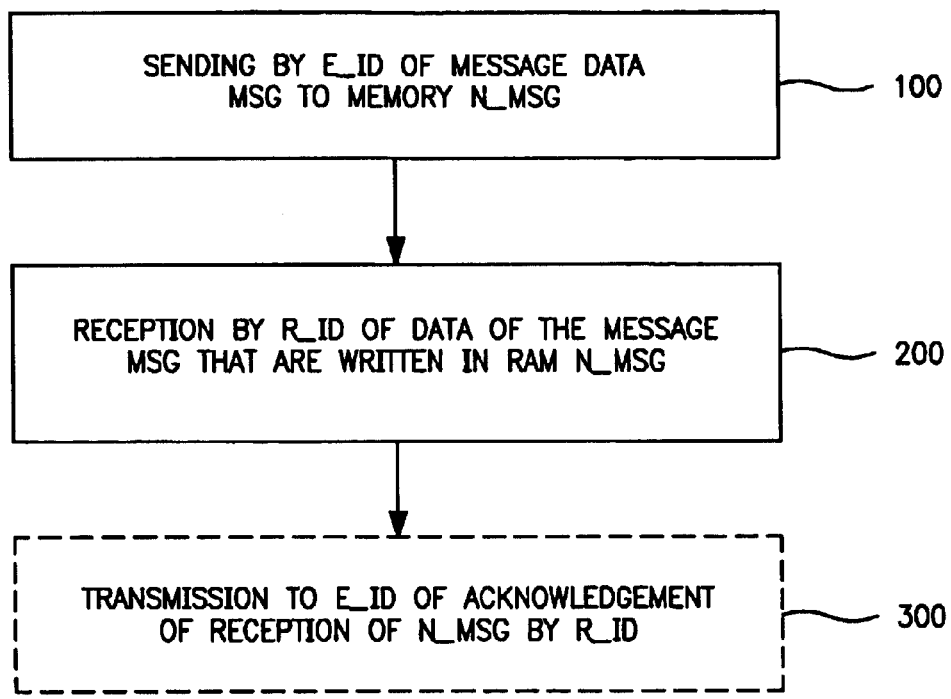
FIGS. 2b–2d show a variant implementation of the step of exchanging an information message, as illustrated in FIGS. 1c and 2a, in the non-limiting case where a procedure of transmitting an acknowledgement of reception of an information message from a target application to a source application is introduced.
Figure 2C:
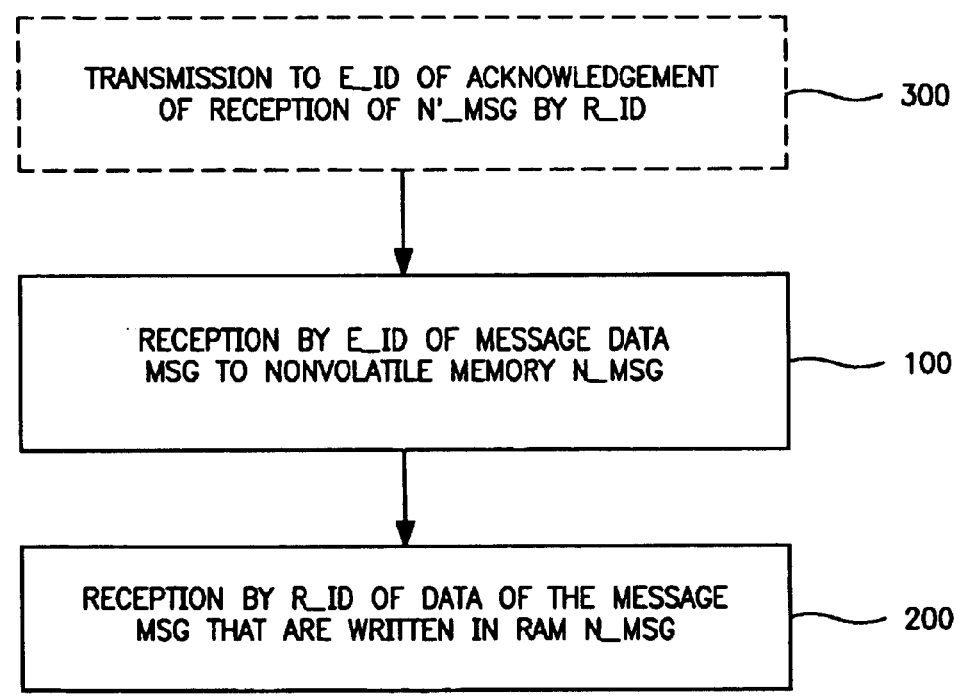
Figure 2D:
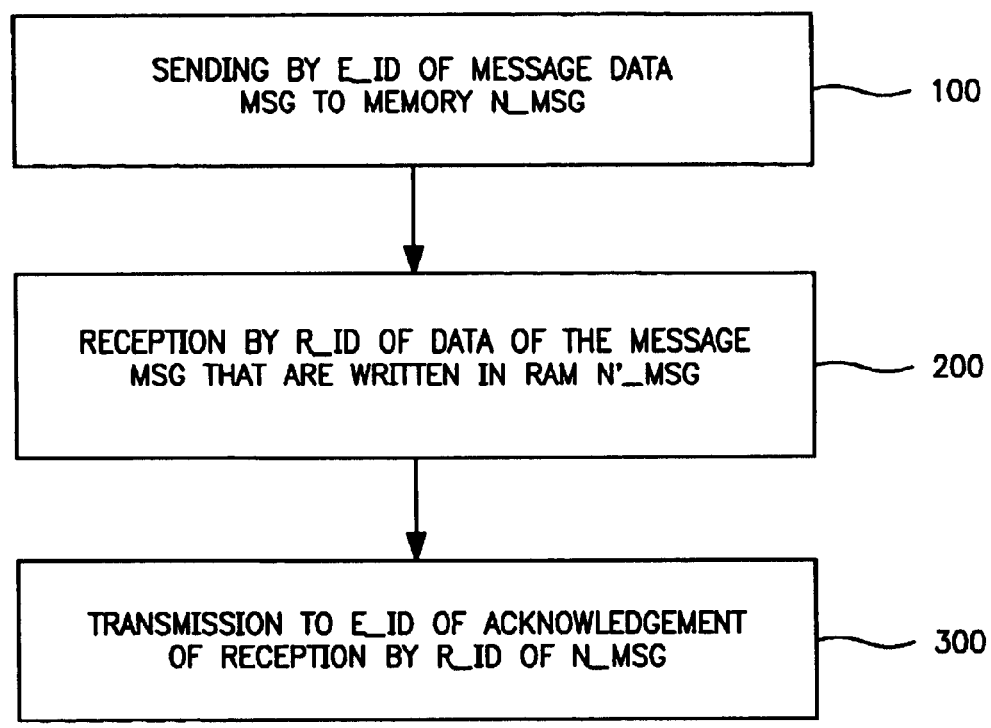

Such a procedure is illustrated in FIGS. 2b–2d, in a non-limiting embodiment.

Preferably and to that end, the structure of information messages MSG can be modified so as to introduce a message identification number into each of the information messages traveling via the internal communications interface, this identification number being added to an information message field, as will be described hereinafter in this description.

Preferably, the management of the message serial number, represented by the symbol N-MSG, is done by the internal communications interface, regardless of the relevant source and/or target application.

To that end, the internal communications interface can advantageously be provided with a routine for counting the number of messages generated in the course of one session of use of the portable multi-application object. By way of non-limiting example, the counter can provide a serial number value for messages of between 1 and 65,532, for example, this message serial number being incremented upon transmission of new message by way of the counter of the internal communications interface. By way of non-limiting example, the aforementioned counter is updated by the internal communications interface and incremented each time a source application sends a message. When an application is used, the counter returns to its initial value 1 when the maximum counting value is reached. The 0 value assigned to a message serial number N-MSG can be specific and reserved for messages MSG intended for applications not recognized by the internal communications interface.

In a first mode of implementation of the step of transmitting a message acknowledging reception of the information message MSG to the source application E-ID, it can be seen from FIG. 2b that the transmission of this reception acknowledgement message takes place later than steps A and B for assigning a source and target application attribute, and later than step 100 for sending, by the application E-ID, of data of the message MSG with which a message serial number N-MSG is associated to the nonvolatile memory, and step 200 of reception by the target application R-ID of data of the message MSG that have been written in this nonvolatile memory.

Under these conditions, as shown in FIG. 2b, the step of transmitting the message acknowledging reception by the target application R-ID of the message MSG whose identification number N-MSG takes place later than the two aforementioned steps 100 and 200 and in fact constitutes a simple verification of the reception of the latest information message transmitted from the source application E-ID to the relevant target application R-ID.

Nevertheless, the step of transmitting the reception acknowledgement message to the source application E-ID can also be implemented later or even during the step of exchanging the information message between the source application and the target application, that is, as shown in FIGS. 2c and 2d, prior to step 100 in which the application E-ID sends the data of the message MSG and the corresponding step 200 of reception of the aforementioned message MSG by the application R-ID, or as shown in FIG. 2d, between the aforementioned sending and receiving steps 100 and 200, respectively.

In these two cases shown in FIGS. 2c and 2d, it is noted that in accordance with a particularly advantageous aspect of the protocol that is the subject of the invention, the step of transmitting the reception acknowledgement message to the source application E-ID pertains not to the message MSG whose identification number is N-MSG sent in step 100, but not yet received in the later step 200 by the relevant target application R-ID, but instead is a message MSG with a different identification N'-MSG, which is of an earlier order to the aforementioned message MSG numbered N-MSG.

It is understood that under these conditions, the assignment of a specific message identification attribute, constituting a message serial number, thus makes it possible to assure complete management of the process of transmission and reception of these information messages by each destination application, and in particular assure complete management of the process of exchanging data or information between applications of a portable multi-application object, between separate usage sessions of this portable multi-application object.

In particular, for a transaction made on a given date, it is thus possible to perform verifications relating to this transaction at a later date by simply verifying the reception of corresponding messages with an identification number that pertain to the relevant target application.

In order to make the step of transmitting a message that acknowledges reception by the relevant target application R-ID to the source application E-ID substantially independent of the source application E-ID, this operation can be done by way of the call, on the part of the source application E-ID, for a primitive that makes it possible to assure the transmission of the acknowledgement message to the appropriate source application E-ID.

A preferred embodiment of the step of sending and the step of receiving each message information MSG will now be described in conjunction with FIGS. 3a–3c, which relate to a specific structure of the aforementioned messages MSG, making it possible in a particularly advantageous way to implement the aforementioned sending and receiving procedures.

In this preferred embodiment, it will be seen that in FIG. 3a, each message MSG includes a data field, which is nothing more than the contents of the message, and as noted earlier in this description, also a source application attribute field E-ID that in fact identifies the source application, a target application field consisting in fact of a list of information about the destination or target applications, and finally, a message number field N-MSG in fact made up of a serial number for each message delivered by the internal communications interface under the conditions given above in this description.

With regard to the list of information about the destination applications, this list being represented by the symbol LID-Dest; as shown in FIG. 3b, for each relevant destination application, this list can advantageously include an identifier, or identification attribute ID-D, marked ID-$D_1$ through ID-$D_4$, of the relevant destination application, to which is added a message state word S-L, marked S-$L_1$ through S-$L_4$, relating to the reading by the relevant destination application, this state word in fact constituting a descriptor of the read or non-read state of the relevant information message MSG of serial number N-MSG by the corresponding destination application.

Thus, as shown in FIG. 3c, in the list of information about the destination applications LID-Dest, each message MSG includes successive values representing the identification attribute of each destination application and the state, read or not-read, of the corresponding message for the relevant destination application. These successive values then correspond to list elements, the corresponding list elements being mentioned in FIG. 3c, in accordance with the conventional list notation used in customary declarative programming languages. Thus each list element or list term is formed by an identification attribute argument ID-$D_1$ through ID-$D_4$ in FIG. 3c, representing the target application R-ID, and a corresponding reading state argument S-$L_1$ through S-$L_4$, representing the state of the message MSG with respect to the corresponding target application.

The management of such a list can thus be handled in conformance to the conventional management of these lists in the aforementioned languages, in particular by reading the header element of the list, the rest of the list being considered as a list body, and so forth; the management is assured in the conventional way by means of appropriate pointers.

Figure 3D:
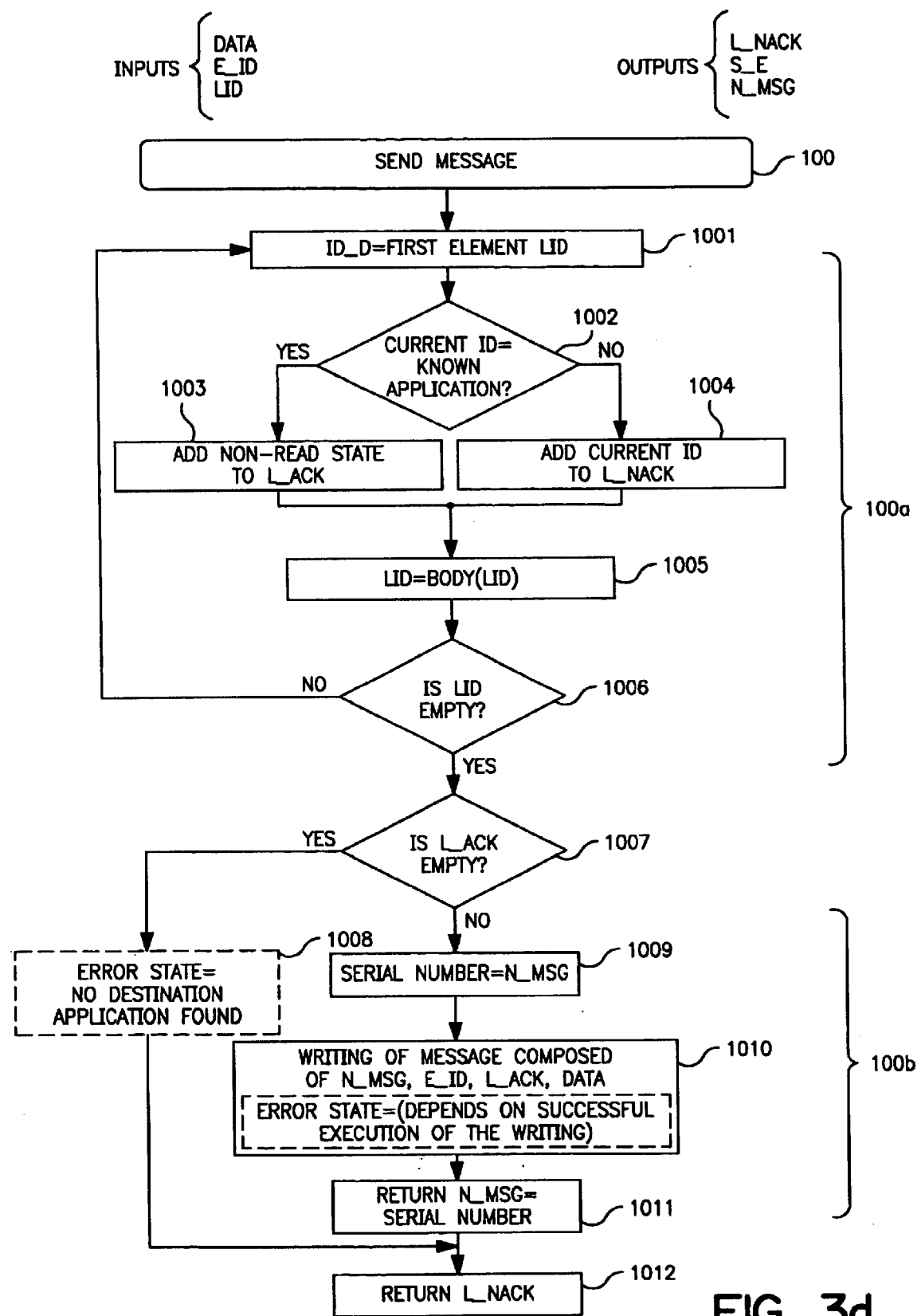
FIGS. 3d and 3e show a detailed flow chart of the procedures of sending and receiving information messages, respectively, in accordance with the protocol that is the subject of the present invention, in particular non-limiting embodiment in which the information messages have the structure shown in FIGS. 3a–3c.

Under these conditions, a preferred embodiment of the message sending procedure 100 can then consist of the various successive steps as shown in FIG. 3d.

This procedure of sending messages MSG is implemented at the level of the source application E-ID. The input parameters are then understood to be the contents of the message established by the source application, the identification attribute of this source application E-ID, and finally the list of identifiers of the destination applications or target applications, marked LID. It is understood that the above list can be generated by the source application E-ID as a function of its own requirements, that is, the various target applications that must be reached by the information message MSG containing the aforementioned data.

The procedure for sending messages as shown in FIG. 3d makes it possible, thanks to a specific implementation, to establish state parameters such as, in particular, a list of identification attributes of missing applications, these missing applications corresponding to applications that are not active or not known to the internal communications interface, enabling the implementation of the protocol that is the subject of the invention. This list is marked L-NACK. The output parameters also include an error state S-E, this state corresponding to various error codes returned at the level of the working memory RAM, for example, for use by the relevant applications, or as applicable by the operating system itself.

Under these conditions, and as shown in FIG. 3d, the procedure or step 100 for sending messages can advantageously include a substep $100_a$ for managing the presence of target applications, this substep $100_a$ particularly advantageously making it possible to generate two lists; a first list L-ACK of the same type as the list of information on target applications LID-Dest, and a list L-NACK made up of a list of identification attributes of applications unknown to the aforementioned internal communications interface. In a specific embodiment, the list L-ACK corresponds to the list of target applications LID-Dest recognized by the internal communications interface in the format shown in FIG. 3c, and the list L-NACK is in the format of a simple list of identification attributes of applications not recognized by the communications interface. In the list L-ACK, the state words S-$L_1$ through S-$L_4$ are initialized to the arbitrary value of non-read status.

The term "application known to the internal communications interface" is understood to mean any application normally installed and implanted in nonvolatile memory of the portable multi-application object and capable, under the control of the operating system OS, of performing the functions reserved to it, and in particular of attributing either a source application attribute E-ID or a target application attribute R-ID. These installation conditions will be explained in further detail hereinafter in the this description.

In order to encompass all the destination applications to which a given message MSG is addressed, that is, the data content processed by a source application E-ID, the aforementioned management step $100_a$ can advantageously include a step 1001 of reading the list of identification attributes of the destination applications LID, this reading operation being done list element by list element, also as noted above in this description, with the first element or header of the list being read and the successive elements, the first element of the body of the list, being read successively.

This reading mode makes it possible to distinguish each list element successively. In these list elements, each identification attribute constituting each list element of the list of identification attributes of destination applications LID is then read.

Step $100_a$ of managing the presence of target applications $100_a$ then includes a first test step 1002 of distinguishing this current element of the identification attribute ID-D as relating to a known application, under the definition given above.

If the response to the first test step 1002 is positive, a step 1003 is provided for adding this identification attribute element ID-D to a list of identification attributes of known applications, the list L-ACK, and if the response to the aforementioned test step 1002 is negative, a step 1004 is also provided, for adding this identification attribute to a list of identification attributes of unknown applications L-NACK. Thus the two above lists, L-ACK and L-NACK, are available, representing the state of applications known and unknown to the internal communications interface mentioned above in this description.

After these steps 1003 and 1004, a step 1005 is performed in which the current identification attribute element of the list LID of identification attributes of destination applications is suppressed; this operation makes it possible to generate an updated list which corresponds to the body of the original list read in step 1001. This operation of suppressing the current identification attribute element of the list of identification attributes can be done by simple recurrent reading, element by element, as mentioned above.

After step 1005, a second test 1006 is provided, this step consisting of a test for emptiness of the list of identification attributes of the destination applications LID after the suppression of the first element; this emptiness test 1006 is thus applied to the body of the original list obtained following step 1005.

If the response to this second test step 1006 is negative, a step returning the current identification attribute element of the updated list LID is performed; since the body of the aforementioned is not empty and constitutes a new list of identification attributes of destination applications, this return is understood to enable looping back to all the operations 1001–1005 and 1006 mentioned above, since the body of the updated list LID is not empty.

If the response to the second aforementioned 1006 is positive, then since the lists L-ACK and L-NACK of identification attributes of known and unknown applications, respectively, are available, a step 1007 for testing for emptiness of the list of identification attributes of the known applications L-ACK is performed. This emptiness testing step 1007 in fact enables direct management of the existence of an abnormal situation, in which the list of known applications is empty, since no application of the portable multi-application object is capable of receiving an information message.

Following the above step 1007, the procedure 100 for sending messages finally includes a step 100$_b$ making it possible to assure that the message MSG is written in nonvolatile memory, taking into account the response to the aforementioned test 1007 for emptiness of the list of known applications.

As further shown in FIG. 3d, the step 100$_b$ of writing the message in nonvolatile memory includes, if the response to the aforementioned test step 1007 is positive, a step 1008 of establishing an error state message, if no destination application is found, this error state message establishment step 1008 being itself followed by a return of the list of identification attributes of unknown applications, that is, the list L-NACK.

With regard to the step establishing an error state 1008 and the step returning the list L-NACK 1012, it is noted that the corresponding information can advantageously be returned by writing into the working memory RAM. This information is then available for direct use, either by the internal communications interface or if applicable by the operating system OS that manages the microprocessor.

The step 100$_b$ of writing the message in nonvolatile memory shown in FIG. 3d also, if the response to the test step 1007 for emptiness of the list L-ACK is negative, includes a step 1009 of attributing an internal serial number to the information message MSG, under the conditions that have been described above in this description.

In the embodiment of the procedure for sending messages shown and described in conjunction with FIG. 3d, it is noted that the internal serial number is a number in the ordinal sense of that word, regardless of the source application E-ID and target applications R-ID involved with the relevant numbered information message MSG.

The step 100$_b$ of writing the message in nonvolatile memory 18$_a$ includes, following the aforementioned step 1009, a step 1010 of writing per se of this message, as defined above, and hence containing the attributes of this latter that comprise the serial number N-MSG, the data contained in the message MSG, the list L-ACK of the identification attributes of the known applications in the nonvolatile memory, the identification attribute of the source application E-ID. When all the destination applications are known to the internal communications interface, the list L-ACK corresponds to the list LID-Dest shown in the format of FIG. 3c.

It will be recalled that at this stage, the reading state of each argument in the above list is always maintained at the non-read state.

Thus as shown in FIG. 3d, the writing step 1010 per se of the message MSG can then advantageously be followed by a step 1011 that returns the serial number N-MSG of the relevant message MSG. This return step, like the return steps 1008 and 1012 mentioned above, can consist of writing the serial number of the message in active memory RAM, for example. Thus the information pertaining to the serial number N-MSG of the message can be used either by the operating system OS or by the internal communications interface, to assure a procedure for transmitting a reception acknowledgement message, as described above in conjunction with FIGS. 2b–2d.

The aforementioned step 1011 is then followed by step 1012 that returns the list L-NACK of the identification attributes of applications unknown to the interface, as noted above.

It will thus be understood that for a given source application E-ID in the course a usage session of such an application, the application must proceed to send a plurality of messages MSG, each message including a serial number N-MSG specific to it, regardless of the relevant application, but also a list of destination applications to which this message is addressed, this list consisting of the list L-ACK of identification attributes of the destination applications and of the reading states known to the interface, for example.

Thus, and in a unidirectional mode of transmission of information messages from a source application E-ID to a plurality of destination target applications, any application of the portable multi-application object known to the communications interface that is the subject of the invention and is distinct from the source application E-ID can accordingly constitute a target application R-ID, to which an information message MSG is addressed as applicable.

Under these conditions, since the information messages have been written in programmable nonvolatile memory 18$_a$, activating an aforementioned target application upon a later use of this application makes it possible to authorize the message reading procedure 200 mentioned earlier in this description.

This message reading procedure 200 will now be described in conjunction with FIG. 3e.

In this procedure, the input parameters are the identification attribute parameters of the relevant target application R-ID, and the output parameters are the data parameters of the message intended for this target application, as well as an error state parameter S-E that consists of an execution report.

Figure 3E:
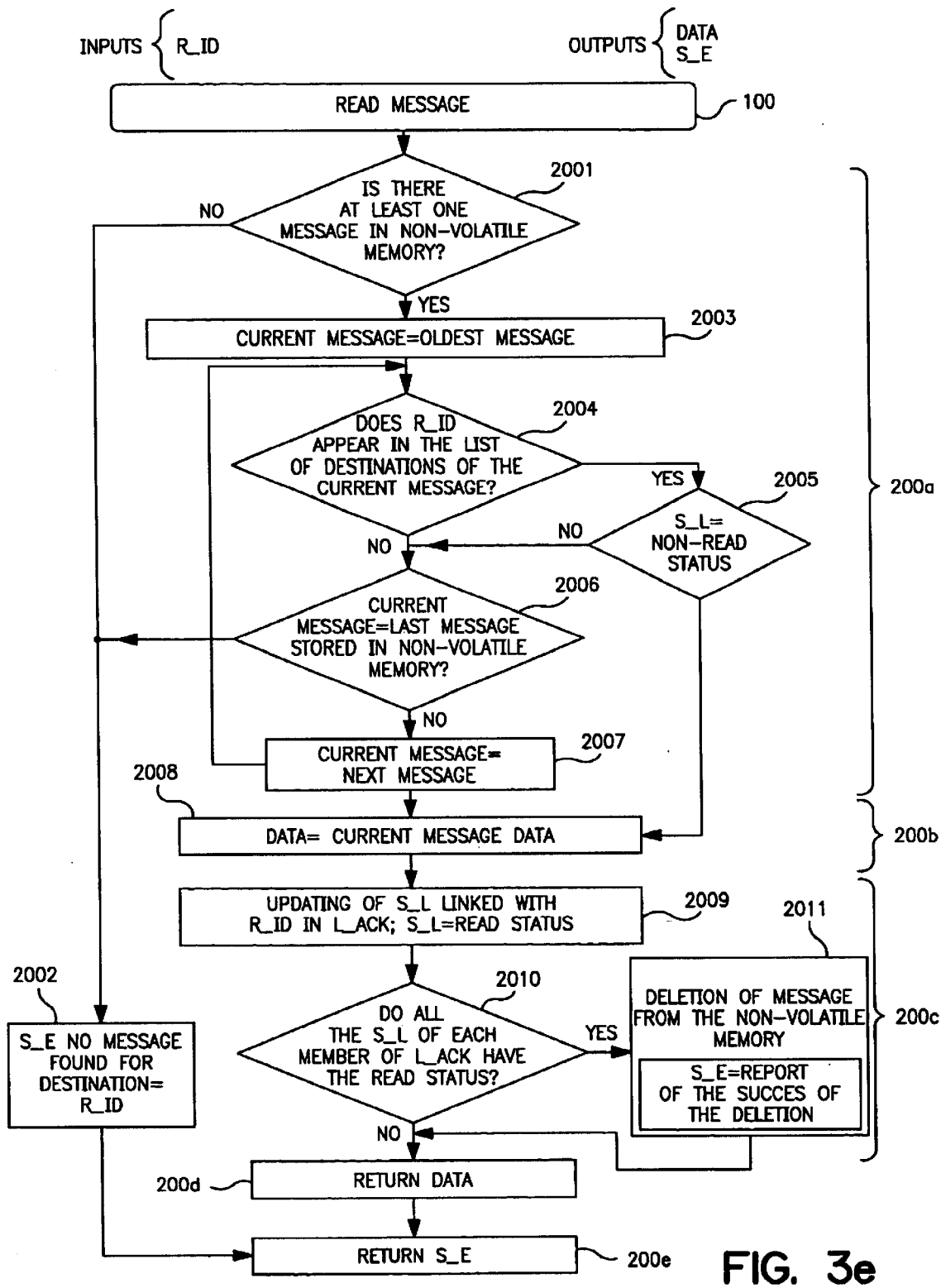

Preferably, as shown in FIG. 3e, the message reading command of the communications interface of the nonvolatile memory can include at least a step 200$_a$ of searching for the first message that has not already been read whose addressee is the target application R-ID, based on the identification attribute R-ID of the target application and a list of identification attributes of the destination applications, the list LID-Dest.

Within the context of a unidirectional transmission, when an application of the portable multi-application object is selected by the user, this application is made active by the operating system. Nevertheless, and in a particularly advantageous characteristic of the protocol that is the subject of the invention, this same application can be assigned a target application attribute with respect to previous transactions. In such a situation, the message reading command 200 can then be initiated as soon as the application held by the user is made active by the operating system OS.

Under these conditions, the step $200_a$ of searching for the first data message not read, for which this target application is the addressee, can advantageously include a test 2001 for the existence of at least one message MSG in nonvolatile memory, intended for the relevant target application R-ID, or in other words the aforementioned active application.

If the response to this test 2001 is negative, a step 2002 of establishing an error state S-E is provided, in the absence of a message MSG addressed to this destination application. The aforementioned step 2002 can then be followed by a step $200_e$ returning an error state, as will be described hereinafter in this description.

If the response to the first test 2001 is positive, a step 2003 is provided, which enables the attribution of the current message quality to the oldest message MSG. It will be understood in particular that given the message serial number N-MSG memorized in nonvolatile memory, it is possible, for performing 2003, to call up a sorting routine which as its current message holds the message with the lowest serial number N-MSG, this lowest serial number accordingly corresponding to the oldest message MSG.

Step 2003 is in turn followed by a second test 2004 for the appearance of the identification attribute of the target application R-ID in the list of identification attributes of destination applications in the relevant current message, that is, the list L-ACK in which the relevant message has been written in nonvolatile memory in step 1010 shown in FIG. 3d.

If the response to the test 2004 is positive, another test 2005 of verifying the reading state of the current message as a non-read message is provided, this verification operation being done by reading the argument of the reading state S-L corresponding to the identification attribute of the relevant target application R-ID.

If the response to the above test 2005 and to the test 2004 is negative, a test 2006 of absolute equality of order of the current message with the last data message stored in nonvolatile memory is performed. This test makes it possible to assure that all the messages memorized in nonvolatile memory and addressed to the relevant destination application R-ID have been scanned.

If the response to the test 2006 is positive, a return is made to the step 2002 that establishes the error state, and if the response to this same above test 2006 is negative, then a step 2007 for attributing the next information message to the current message is performed, and this step 2007 is in turn followed by a return to the test 2004, to assure that all the messages for the relevant target application R-ID have been read.

If the response to the test 2005 is positive, a step $200_b$ of recovery of data contained in the current message is performed. Advantageously, this operation can consist of writing in volatile memory, that is, in RAM, of the data field of the current message written in nonvolatile memory.

The step $200_b$ is in turn followed by a step $200_c$ that makes it possible to assure the management of the state of the message MSG with regard to the relevant target application R-ID, so as to assure complete management of the nonvolatile memory in which this message is written. The step $200_c$ can then be followed by a data return step $200_d$ and the step $200_e$ returning the error state S-E that follows the aforementioned step 2002 establishing an error state. It will be recalled that the data return steps, or error state return steps, can be performed by writing in volatile memory or RAM by the target application R-ID and then by reading by the operating system OS.

With respect to the management step $200_c$ of the state of the message in nonvolatile memory, shown in FIG. 3e, it is noted that for a list of identification attributes of the destination applications LID-Dest or the list L-ACK including list terms formed by an identification attribute argument of the destination application and a reading state argument, as shown in FIG. 3c, corresponding to a read or non-read state of this current message, this step can include a step 2009 of updating the corresponding reading state argument S-L linked with this destination application, by attributing an arbitrary value of the read state to this argument, as well as a test step 2010 for verifying that the value of this reading state argument is equal to the read state argument of each reading state argument of the list of identification attributes of these destination applications. This step 2010 thus makes it possible to verify that all of the destination applications mentioned in the list of destination applications LID-Dest or L-ACK have performed the reading of the relevant message MSG, whose serial number is N-MSG, before any later operation is done.

If the response to the above verification step 2010 is positive, a step 2011 of deleting the current message from the nonvolatile memory is then performed, since all the destination applications have performed the reading of this message. Step 2011 also includes the establishment of an error state S-E, taking into account the success of the aforementioned deletion step.

Thus, after step 2011 of deleting the relevant current message and after the negative response to the step 2010 for verifying that the value of the reading state argument is equal to the value of the read state, the steps $200_d$ and $200_e$ that return data contained in the data field of the message MSG corresponding to the current message and then returning the error state $200_e$ can then be performed.

In general, it will be noted that the corresponding commands and procedures for sending messages and reading messages, as shown and described in conjunction with FIGS. 3d and 3e above, can be implemented in either the presence or the absence of the step 1011 that returns the serial number N-MSG, corresponding to returning the serial number of the current message transmitted, as shown in FIG. 3b. On the hypothesis that the aforementioned 1011 is absent, the message reading step as shown in FIG. 3e can be implemented without change. Finally, the management of the nonvolatile programmable memory $18_a$ from the point of view of writing, reading and deletion of information messages therein, is advantageously performed by the internal communications interface, by a known process for managing concatenated lists, in which in the conventional way each relevant message MSG is assigned corresponding management parameters such as the number of 8-bit bytes in the message, and pointers to the previous and next block.

Nevertheless, the aforementioned step 1011 makes it possible to implement a procedure of transmitting a reception acknowledgement message to the source application E-ID, that is, the procedure 300 shown in FIGS. 2b–2d, in a preferred embodiment, which will now be described in conjunction with FIG. 3f. This procedure is implemented by means of a command or procedure, marked Lecture-ACK-R, enabling a source application or application E-ID that has sent a message MSG earlier to consult the state of this message with regard to reading by a given destination application.

The Lecture-ACK-R command implements the next input parameters, such as an identification attribute of a target application R-ID, and of course a message serial number N-MSG for which the aforementioned source application E-ID seeks to learn the state of this message with regard to reading by the aforementioned destination application.

At the output, the command Lecture-ACK-R returns the parameters relating to a Boolean result called "message acknowledged", or M-A, indicating the state, read or non-read, of the aforementioned message of serial number N-MSG, by this target application, as well as an error state S-E relating to the operation performed by the Lecture-ACK-R command 300.

Figure 3F:
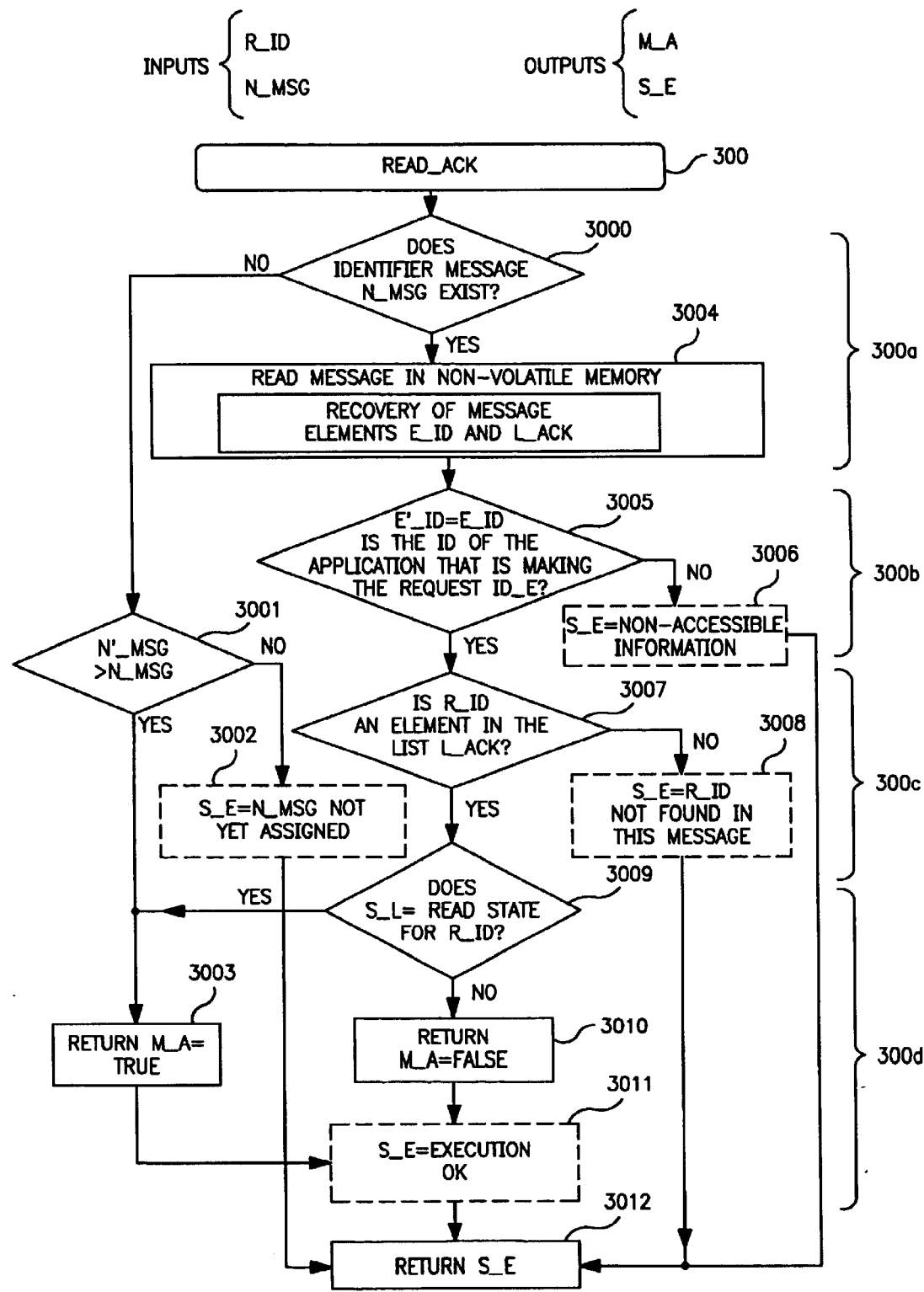
FIG. 3f shows a flow chart relating to a procedure of transmitting a message acknowledging reception of a given information message to the source application, in a specific, non-limiting embodiment.

As shown in FIG. 3f, the Lecture-ACK-R command includes a step $300_a$ of reading and verifying the presence of the relevant message with the serial number N-MSG; a checking step $300_b$ making it possible to verify that an application can ask for only acknowledgement of messages for which it is the source; a step $300_c$ for searching for the identification attribute of the relevant target application R-ID pertaining to the applicable message N-MSG, and finally, a result calculation step $300_d$ comprising the establishment of the Boolean parameter M-A indicating the state of the message, that is, read or not read.

The mode of operation of the aforementioned command, in the preferred embodiment shown in FIG. 3f, is as follows:

The operating system OS furnishes the internal communications interface with the identification attribute of the selected source application E-ID. This application makes it possible to check that, in the case for the message with serial number N-MSG has not been deleted, the application that executes the command Lecture-ACK-R, that is, in the case of unidirectional transmission, as mentioned above in this description, the selected source application E-ID is indeed the one that sent the aforementioned message.

Under these conditions, a given application can obtain information about only those messages for which it is the source. Otherwise, an error message is sent.

In the case where the identification attribute of the target application R-ID is not a member of the list of destination applications LID-Dest, an error message is also sent.

The aforementioned operations can be implemented as follows:

Step $300_a$

A test verifying the existence of the message of serial number N-MSG, test 3000, is performed. If the response to this test is negative, a test 3001 is provided, making it possible to verify that the serial number of the next message N'-MSG is higher than the aforementioned number N-MSG.

If the response to test 3001 is positive, then in a step 3003 the true value is assigned to the Boolean parameters M-A that indicate the message state, read or not read. This step 3003 is then followed by a step 3011, the correct execution value, indicated as execution OK, is assigned to the error state S-E. Step 3011 is followed by a step 3012 that returns an error state S-E.

If the response to the above test 3001 is negative, then a step 3002 of assigning an error state S-E is performed, because of the absence of a message serial number N-MSG assigned to the relevant message in this step of the procedure. Step 3002 is followed by the step 3012 that returns the corresponding error state. Steps 3001, 3002, 3003 makes it possible to manage the nonexistence of a corresponding message of serial number N-MSG.

Upon a positive response to the above test 3000 in step $300_a$, a step 3004 is provided, comprising the reading of the message in nonvolatile memory whose serial number is N-MSG. This step requires the recovery of message elements, in particular such as the identification attribute of the source application E-ID associated with the message of the relevant serial number and the list of destination applications LID-Dest or the list L-ACK.

Step $300_b$

Step 3004 is followed by a test 3005 consisting of verifying that the identification attribute of the application that starts the command Lecture-ACK-R corresponds to the identification attribute of the source application E-ID of the message of serial number N-MSG. This test step is marked E'-ID=E-ID in FIG. 3f.

Upon a negative response to the above step 3005, a step 3006 is provided, which is a step of establishing an error state S-E at the value "information not accessible". This step is followed by the return of the error state 3012 as noted above.

Step $300_c$

Upon a positive response to the above test 3005, a test 3007 is provided, enabling verification of the appearance of the identification attribute of the destination application as an element in the list of destination applications LID-Dest or the list L-ACK. If the response to test 3007 is negative, a step 3008 is provided of establishing the error state SE, since the identification attribute of the destination application R-ID has not been found in the relevant message of serial number N-MSG. Step 3008 is followed by the step returning an error state 3012.

Step $300_d$

Upon a positive response to the above test 3007, a new test 3009 is provided, which comprises verifying that the reading state S-L has the read state value for the relevant destination application R-ID. This operation is marked S-L= read state for R-ID.

Upon a positive response to the above test 3009, the step that returns the Boolean message M-A to the true value, that is, step 3003, is called, and then the above step 3011 of establishing the error state S-E at correct execution is also called.

Upon a negative response to the above test 3009, a step 3010 is provided, which corresponds to establishing the Boolean message M-A at the false value, M-A=FALSE, since the message has accordingly not been read by the relevant destination application R-ID. Step 3010 is then followed by the step 3011 of establishing the error state S-E at the correct execution.

In general, it is noted that once the command Lecture-ACK-R is started, the result of the request is true, and as a consequence the message whose given number N-MSG has been read by the given destination application R-ID is acknowledged, in the following cases:

When this message is deleted, the identification number of this message being strictly lower than the next available message number, or When the identification attribute of the given destination application R-ID is present in the list of identification attributes of destination applications LID-Dest and the reading state S-L of the corresponding message is at the value "message read".

In all other cases, the result is false.

A specific mode of management of the source and target applications and in particular of assigning a source and target application attribute to various applications of the portable multi-application object that is the subject of the present invention, in the case of unidirectional communication of an information message MSG, will now be described in conjunction with FIGS. 4a and 4b, relating to an installation and uninstallation procedure for these applications.

In a particularly significant feature of the protocol that is the subject of the invention, the management of the source and target application attributes is done by the internal communications interface itself, in conjunction with the operation system OS.

Figures 4A, 4B:
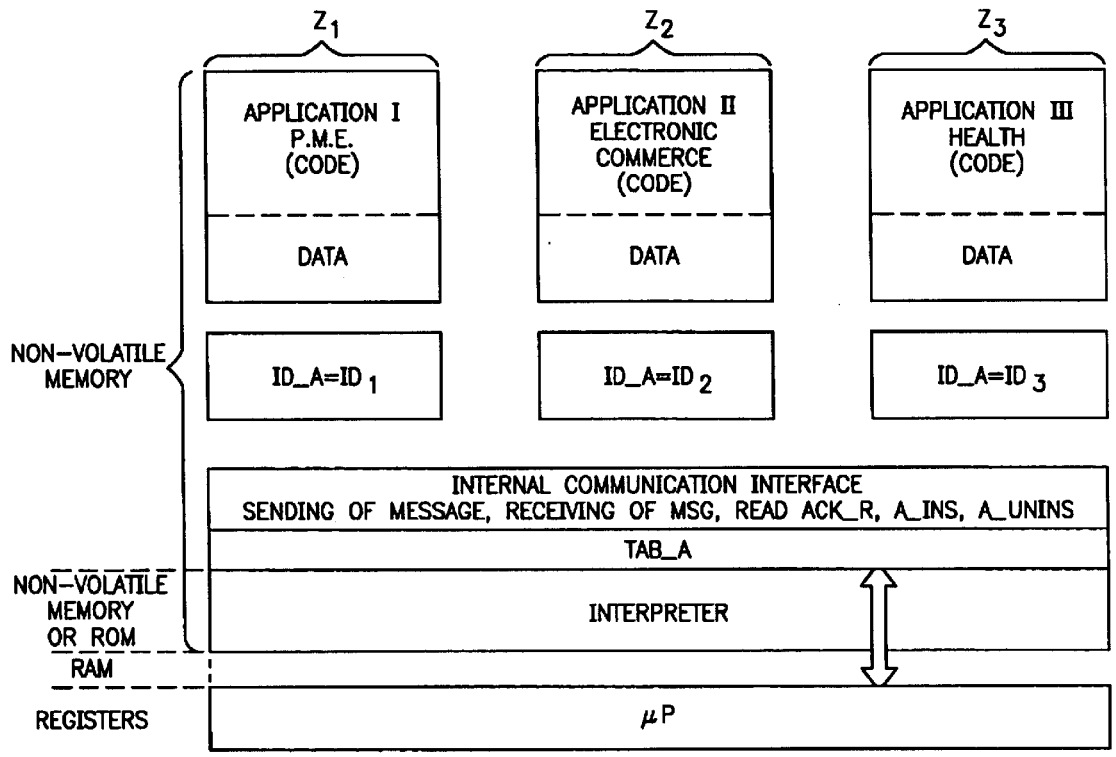
FIGS. 4a and 4b relate to a specific embodiment of an installation and uninstallation procedure making it possible to assign a source application attribute to one application and a target application attribute to other applications.

As shown in FIG. 4a, the internal communications interface is provided on the one hand with commands or primitives designated as sending MSG, receiving MSG, Lecture-ACK-R, and installation and uninstallation primitives or commands A-INS and A-UNINS, respectively, which will now be described in conjunction with FIGS. 4b, 4c and 4d.

Furthermore, to assure the management of the applications of the portable multi-application object that is the subject of the present invention, the internal communications interface has a memory zone in nonvolatile memory, as shown in FIG. 4a, in which the interface stores a table of data, marked TAB-A, and for each application, these data comprise the identification attribute ID-A of the relevant application, with which an 8-bit validation byte for each application, marked O-V, is associated, which is a Boolean parameter indicating the character, activity or nonactivity, of the relevant application with regard to the internal communications interface implemented.

An application inserted into the data table TAB-A can thus be either a source or a target.

It will be noted that in the course of use and implementation of the protocol that is the subject of the invention, the 8-bit validation byte mentioned above makes it possible to manage a succession of configurations of unidirectional transmissions between any source application and the target applications, regardless of the relevant source application among these applications. It is understood that the table of applications TAB-A memorized in the memory zone of the aforementioned internal communications interface is consulted upon each activation of commands for sending or receiving a message by way of the communications interface.

An illustration of the table of applications TAB-A is provided in FIG. 4b.

Figure 4C:
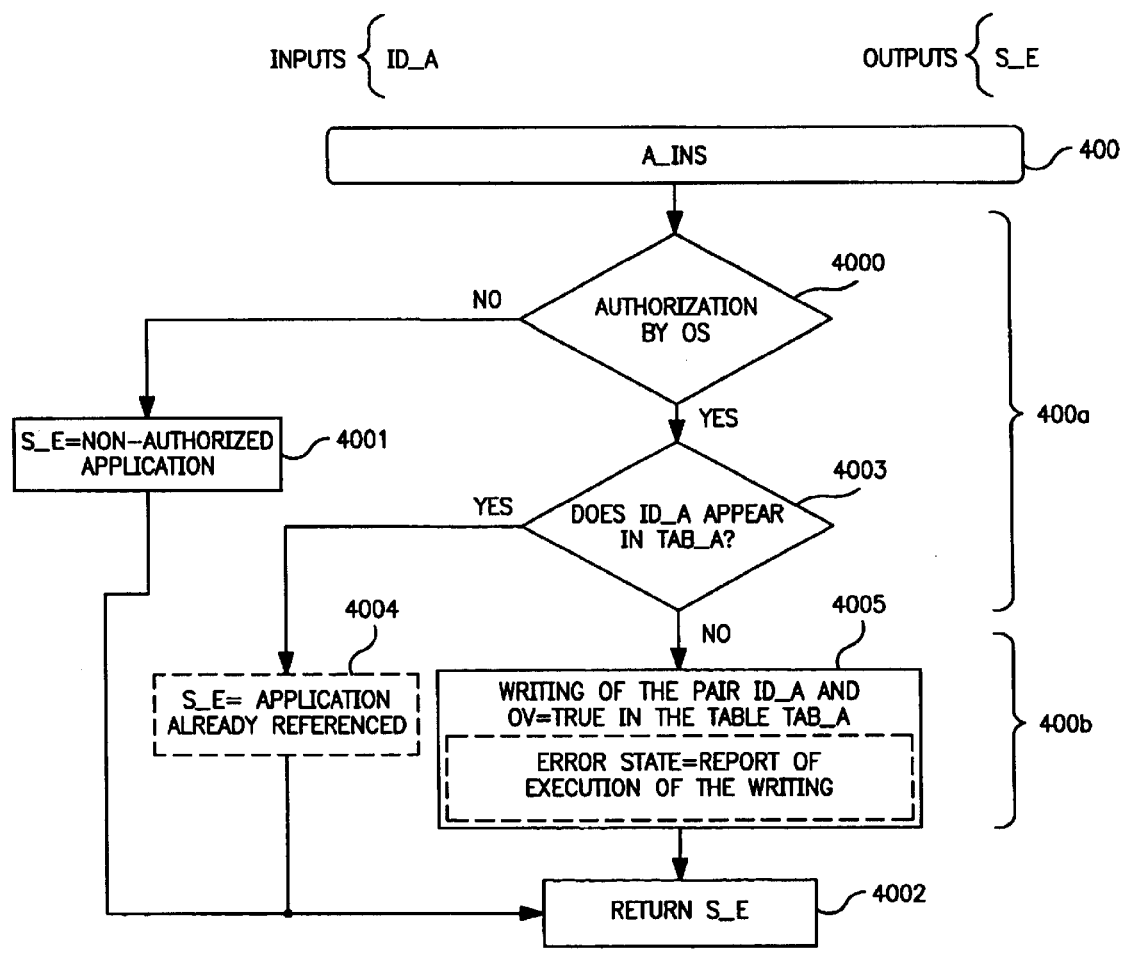
FIG. 4c is a specific flow chart for an installation process implemented in conjunction with the installation-uninstallation procedure shown in FIGS. 4a and 4b.

With regard to the install command A-INS, with reference to FIG. 4c, it is noted that this command, as its input parameter, implements the identification attribute ID-A of the application that has been validated as active by the operation system OS.

To that end, the install command 400 A-INS can include a step $400_a$, consisting of checking that an application with the same identification attribute is not already considered by the internal communications interface to be active, followed by a step $400_b$ comprising writing information in the table of referenced applications, that is, the table TAB-A. The aforementioned install command output parameters pertain to an error state S-E returned as a function of the difference situations encountered.

For implementation of step $400_a$ as shown in FIG. 4c, this step can include a 4000 of authorization, by the operation system OS, to proceed with the installation. It will be noted that the authorization criterion can be multiple, and that in a simplified embodiment, this authorization criterion can consist simply of the fact that the application is considered by this operation system to be active. If the response to test 4000 is negative, an error state is established in step 4001, the value "application not authorized" being assigned to the error state S-E. This step 4001 is followed by a step 4002 returning an error state, as mentioned above in this description.

If the response to the authorization step 4000 by the operating system OS is positive, then the internal communications interface that is the subject of the present invention takes over and implements a test step 4003 verifying the appearance of the identification attribute ID-A in the table of installed applications. The test 4003 can consist of verifying that the 8-bit validation byte O-V has the true value.

If the response to the above test 4003 is positive, then a step 4004 is performed of establishing an error state S-E, established at the value "application already referenced". Step 4004 is followed by step 4002 returning an error state as noted above.

If the response to test 4003 is negative, step $400_b$ can comprise a step 4005 consisting of reading the pair ID-A and the 8-bit validation byte O-V at the true value in the table of applications TAB-A, in nonvolatile memory. This step 4005 also includes a step of establishing an error state S-E corresponding to a report of execution of the reading in the application table TAB-A. The aforementioned step 4005 is in turn followed by the step returning an error state 4002 noted above.

Thus the active state of the application ID-A with regard to the communications interface is guaranteed by the fact that it is the application itself that, under the authorization of the operating system OS, executes the aforementioned command A-INS.

When the source application no longer wants to proceed with communicating information messages MSG, or if the operating system OS invalidates the relevant application, an uninstallation procedure can be executed, either by the application itself or by the operating system OS, via an uninstall command A-UNINS.

The object of the uninstall command A-UNINS is to prevent the referencing of the application in the internal communications interface and in particular to correct the value of the 8-bit validation byte O-V by assigning it the value "false", since the relevant application with the identification attribute ID-A is accordingly no longer considered to be a known application.

Figure 4D:
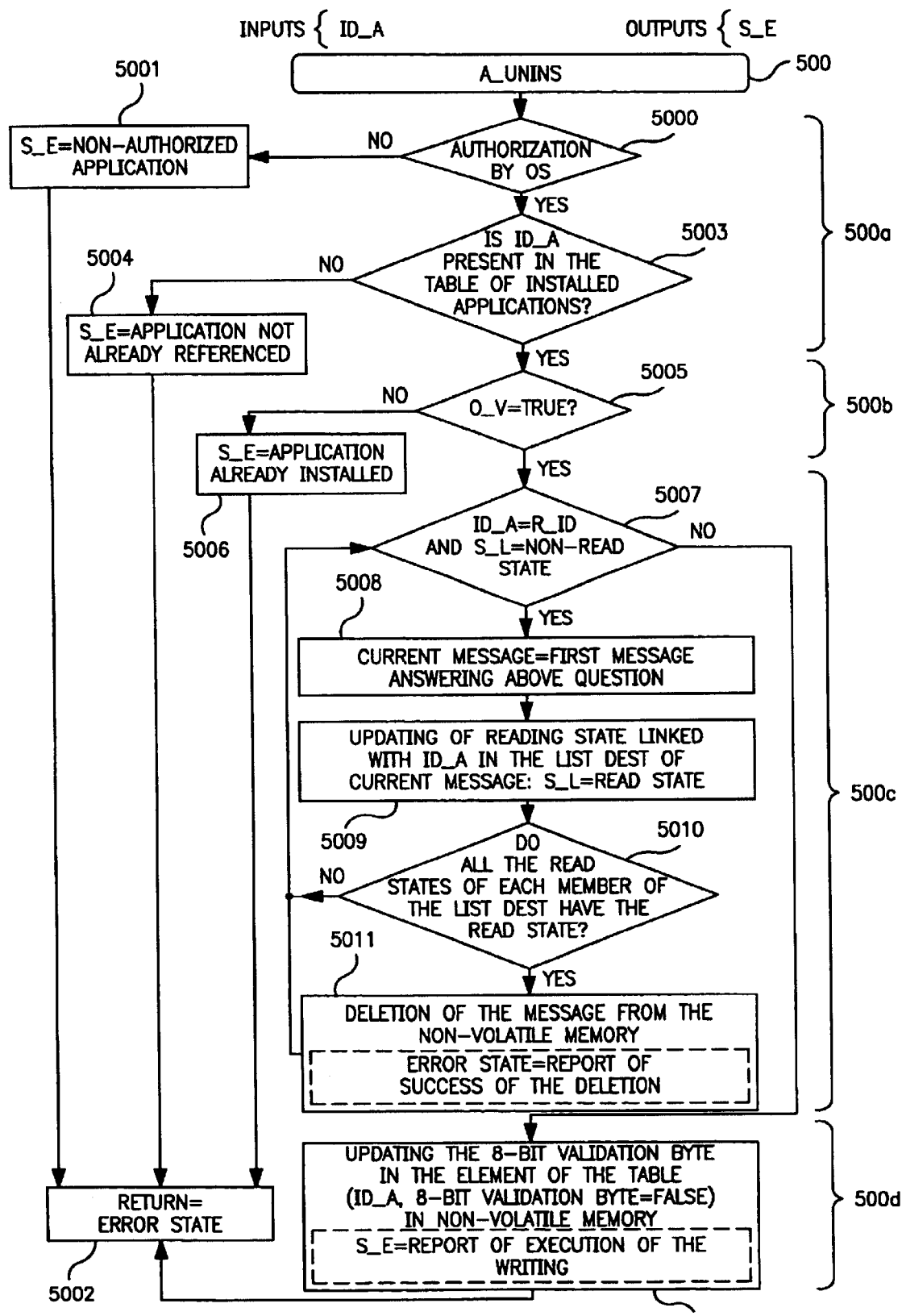
FIG. 4d shows a specific flow chart for a uninstallation process implemented in conjunction with the installation-uninstallation procedure shown in FIGS. 4a and 4b.

Turning to FIG. 4d, the input parameters of the uninstall command 500 are the identification attribute ID-A of the relevant application, and the output parameters are an error state S-E returned as a function of the various situations encountered.

Thus as shown in FIG. 4d, the aforementioned install command includes a step $500_a$ making it possible to assure checking that the relevant source application is installed or has been installed earlier, a step $500_b$ making it possible to check that this application has not been the subject of a previous uninstallation procedure, a step $500_c$ of managing information messages MSG waiting to be read by the application subjected to uninstallation, and finally, a step $500_d$ making it possible to update the validity indicator of the application, that is, the 8-bit validation byte O-V, with respect to the communications interface.

With respect to the various steps, these can advantageously include:

step 500a

Step 500a comprises and authorization verification step or test 5000 verifying the authorization of uninstallation by the operating system OS.

As mentioned above in the description of the install command 400, this authorization step can consist of a plurality of authorization criteria established at the level of the operating system OS. By way of example, this test can make it possible to avoid deleting applications and introducing fraudulent applications with the same identifier.

In a simplified embodiment, corresponding to the install command 400, the authorization criterion can simply comprise the fact that the application subjected to the uninstallation process is considered by the operation system OS to be active.

If the response to the above test 5000 is negative, a step 5001 of establishing an error state S-E at the value "uninstallation not authorized" is performed, and this step 5001 is followed by a step 5002 that returns an error state, as mentioned above in the description.

If the response to the above test 5000 is positive, then a test 5003 is performed, which can comprise verifying that the identification attribute ID-A of the application subjected to the uninstallation process is present in the table of installed applications.

Upon a negative response to the above test 5003, a step 5004 of establishing an error state S-E at the value "application not already referenced" is established, and this step 5004 is followed by step 5002 returning an error state.

Step 500b

Upon a positive response to the above test 5003, step 500b is performed, for example by means of a test 5005 making it possible to verify that the value of the 8-bit validation byte O-V is equal to the true value.

Upon a negative response to the above test 5005, a step 5006 is provided, enabling the establishment of the error state S-E at the value "application already uninstalled".

Step 5006 is followed by step 5002 returning an error state as mentioned above in the description.

Step 500c

Upon a positive response to test 5005, step 500c is implemented by means of a test 5007 verifying the existence of a message, one of whose addressees corresponds to the identification attribute ID-A and whose reading state S-L is at the value "non-read state". This test is written in the form of the following logical formula:

ID-A=R-ID AND S-L=non-read state

Upon a positive response to the above test 5007, a step 5008 is performed, with which the first message that meets the condition of test 5007, that is, the message with the lowest serial number, can be attributed as a current message. Step 5008 is followed by a step 5009 enabling updating of the reading status S-L linked with the relevant application subjected to uninstallation, whose identification attribute is ID-A in the list of destination applications, the read state value being attributed to the reading state S-L. Step 5009 is in turn followed by a step 5010 consisting of verifying that the aforementioned value of the reading states of each member of the list L-ACK is equal to the value "read state".

Upon a positive response to the above test 5010, a step 5011 of deleting the message MSG from nonvolatile memory is performed; this step includes a step of establishing the error state S-E at the value "taking the success of the deletion into account".

Upon a negative response to the test 5010 and after the above step 5011, a return is made to the test step 5007 for another message with a different serial number, for the same application subjected to uninstallation and having an identification attribute ID-A.

Step 500d

Upon a negative response to the above test 5007, step 500d is performed by means of a step 5012 consisting of updating the 8-bit validation byte O-V in the table of applications TAB-A in nonvolatile memory, by attribution of the false value to the 8-bit validation byte O-V, for the relevant application having the identification attribute IDA. This above step 5012 also includes a step of establishing an error state S-E at the value "taking into account execution of the reading" in the table of applications. Step 5012 is in turn followed by step 5002 returning an error state.

An example of a general mode of operation of the internal communications interface making it possible to implement the protocol that is the subject of the invention will now be given in conjunction with FIGS. 5a, 5b and 5c.

By way of non-limiting example, with reference to FIG. 5a, it is noted that the internal communications interface is found to include a table of applications TAB-A in which the application number 1, ID-$A_1$, is valid, since its 8-bit validation byte O-V is at the value "valid", and application number 2, ID-$A_2$ is invalid, following an operation by the operation system OS, for example, since the 8-bit validation byte O-V of this latter application is at the value "invalid", applications numbers 3 and 4 in turn being valid.

FIG. 5b, by way of example, shows a situation in which the application ID-$A_1$ is the source application of a message of serial number N-MSG=38 sent to the target applications known to the communications interface that is the subject of the present invention. In this situation, the list L-ACK includes only the applications ID-$A_3$ and ID-$A_4$, because the application ID-$A_2$ is invalid, its statute words being in the non-read position N-L, and the data per se of the information message being marked XXXX.

Finally, FIG. 5c corresponds to the same message N-MSG=38 memorized in the programmable memory $18_a$ after this message has been read by the sole destination application I-$DA_4$, since the reading state attribute pertaining to this application in the list L-ACK is at the value READ. The message N-MSG=38 is not deleted from the programmable memory until after all the reading state attributes have been put at the value READ, each destination application having proceeded to reading the relevant message.

With respect to the implementation of the protocol that is the subject of the invention, it is noted that it can be amenable to various developments.

Whereas the above description enables an implementation by unidirectional transmission of messages from a source application to various target applications, it is furthermore possible to provide a hierarchy of applications contained in the portable multi-application object that is the subject of the present invention. To that end, it is then possible to subdivide the table of applications TAB-A into two distinct tables, one of them pertaining to the source applications and the other to the target applications, for example. Furthermore, in such a case, the install and uninstall commands described in conjunction in FIGS. 4c and 4d can then be dedicated to a specific application.

Finally, it is noted that a process of safeguarding of the installation process can be done by the application with different criteria at the level of the authorizations 4000 and 5000 furnished by the operating system, for example.

In other words, access to the internal messaging system via the internal communications interface and the protocol that is the subject of the invention can be on the condition of various criteria, such as knowledge of a password or the like. Under these conditions, the above tests 4000 and 5000 can be made consecutive to the knowledge, by the relevant application, of the aforementioned password or of a specific key.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope for the invention as set forth herein and defined in the claims.

What is claimed is:

1. In a portable multi-application object comprising input/output means enabling communication with a terminal, information processing means connected to the input/output means, a working memory and a programmable nonvolatile memory connected to the information processing means, said nonvolatile memory including a specific memory zone for each application, each specific memory zone being subdivided into a specific memory zone for data, a specific memory zone for instructions, and a specific memory zone for identification that relate to said application, a protocol for internal exchange of information among said applications, an internal communications interface provided with at least one message sending command and one message reception command that reside in the nonvolatile memory said protocol comprising:
   a) assigning to a first application, via an identification attribute of said first application, a source application attribute upon request for said first application to send an information message to one or more other applications;
   b) assigning to at least one second application, distinct from said first application, via an identification-attribute of said second application, a target application attribute upon request for said first application to send an information message to said second application;
   c) proceeding with the exchange of the information message between said first and said at least one second application by sending said information message on the part of the first application and then receiving said message by said at least one second application, by the implementation of said communications interface used as an intermediary, for assuring an exchange of information between said applications while substantially preventing the risk-of interaction between said applications.

2. The protocol of claim 1, characterized in that it further includes a step of transmission to the source application, via said communications interface, of a message acknowledging reception of said information message by said destination application, the transmission of said reception acknowledgement message occurring later than the steps of assigning a source application attribute and a target application attribute, but either before or after or even during the step of proceeding with the exchange of the information message between the source application and the target application.

3. The protocol of claim 2, characterized in that said information message includes at least:
   a field relating to data exchanged between said applications;
   a field relating to constituent 8-bit bytes of the field relating to the data exchanged; and
   at least one field relating to an identifier of a target application.

4. The protocol of claim 1, characterized in that the exchange of the information message comprises the steps of:
   sending said information message from said source application to a memory zone of said working memory, via said message sending commands;
   receiving by said target application, of said information message written into said memory zone of the working memory, via said message reception command.

5. The protocol of claim 4, characterized in that the step of sending of said information message consists at least of:
   an instruction for said source application to write said information message in a memory zone of said nonvolatile memory;
   a call by said source application for a message sending command of communications interface of the programmable memory; and
   transmission by said communications interface to said source application of a transmission acknowledgement message.

6. The protocol of claim 5, characterized in that said step of sending further includes, based on the identification attribute of the source application, a list of identification attributes of the destination applications (LID), said list consisting of a succession of list elements as follows:
   a step of managing the presence of source applications, including at least for each current identification attribute element of said list of identification attributes of destination applications (LID):
   a first step of discrimination testing of the current identification attribute element as relating to a known application, and if the response is positive to said first test step,
   a step of adding said identification attribute element to a list of identification attributes of the known applications (L-ACK), and if the response to said first test step is negative,
   a step of adding said identification attribute element to a list of identification attributes of unknown applications (L-NACK); and following said addition steps,
   a step of suppressing the current identification attribute element of said list of identification attributes of the destination applications (LID) so as to generate an updated list; and
   a second step of testing for emptiness of said list of identification attributes of the destination applications (LID), and if the response to said second test step is negative,
   a step of returning to the current identification attribute element in said updated list, constituting a new list of identification attributes of the destination applications, and if the response to said second test is positive,
   a step testing for emptiness of said list of identification attributes of the known applications (L-ACK), and
   said step of instruction for writing from said source application.

7. The protocol of claim 6, characterized in that said writing instruction step includes at least:
   a step of testing for emptiness of said list of identification attributes of the known applications (L-ACK), and if the response to said step of testing for emptiness of said list of identification attributes of known applications (L-ACK) is positive, a step of establishing an error state message, in the absence of a found destination application, and if the response to said step testing for emptiness of said list of identification attributes of the known applications (L-ACK) is negative, a step attributing an internal serial number to said information message, and a step of writing per se of said message and the attributes of said message constituted by said serial number, the data contained in this information message, and the list (L-ACK) of identification attributes of the known applications; in the nonvolatile memory;

a step returning the message number; and following the steps of establishing an error state message and returning the message number, a step of returning the list (L-NACK) of the identification attributes of the unknown applications.

8. The protocol of claim 5, characterized in that said information message includes at least:
   a field relating to data exchanged between said applications;
   a field relating to constituent 8-bit bytes of the field relating to the data exchanged; and
   at least one field relating to an identifier of a target application.

9. The protocol of claim 4, characterized in that the receiving of said information message comprises a call by said target application for the message reading command of the communications interface of the nonvolatile memory.

10. The protocol of claim 9, characterized in that given the identification attribute of the destination application and a list of identification attributes of the known applications (L-ACK), said message reading command of the communications interface of the nonvolatile memory includes at least:
   a step of searching for the first data message not read for which the target application is the destination, said search step including at least:
   a first test for the existence of at least one data message in working memory, and if the response to said first test is negative,
   a step establishing an error state, in the absence of a data message intended for this destination application, and if the response to said first test is positive,
   a step of attributing the oldest data message to the current message, and
   a second test for the appearance of the identification attribute of the target application in said list of identification attributes of the known applications (L-ACK), and if the response to said second test is positive,
   a third test verifying the status of the current message as a non-read message, and if the response to said second and third tests is negative,
   a fourth test of absolute serial equality of the current message with the last data message stored in nonvolatile memory, and if the response to said fourth test is positive, returning to said step of establishing an error state, and if the response to the fourth test is negative,
   a step attributing to the current message the next data message and returning to said second test, and if the response to said third test is positive,
   a step of recovery of the data contained in said current message, for transmission to said destination application, and
   a step of managing the status of said current message,
   a step of transmission of the data recovered to said destination application, and
   a step of returning the error state consecutive to the step of transmission of the recovered data and consecutive to the step of establishing the error state, in the absence of a data message intended for this destination application.

11. The protocol of claim 10, characterized in that for a list of identification attributes of the destination applications that includes list terms formed by an identification attribute argument of the destination application and a reading status argument representing the status of the current message with respect to the reading by this destination application and corresponding to a read or non-read status of this current message, the step of managing the status of said current message includes at least:
   a step of updating the reading status argument linked with the destination application, by attribution of a read status value to said argument; and
   a test step consisting of verifying that the value of the reading status argument is equal to the read status value of each reading status argument of said list of identification attributes of the known applications, and if the response to this verification test step is positive,
   a step of deletion, in the nonvolatile memory, of said current message and of t establishing an error state, taking the success of this deletion step into account.

12. The protocol of claim 9, characterized in that said information message includes at least:
   a field relating to data exchanged between said applications;
   a field relating to constituent 8-bit bytes of the field relating to the data exchanged; and
   at least one field relating to an identifier of a target application.

13. The protocol of claim 4, characterized in that said information message includes at least:
   a field relating to data exchanged between said applications;
   a field relating to constituent 8-bit bytes of the field relating to the data exchanged; and
   at least one field relating to an identifier of a target application.

14. The protocol of claim 1, characterized in that said information message includes at least:
   a field relating to data exchanged between said applications;
   a field relating to constituent 8-bit bytes of the field relating to the data exchanged; and
   at least one field relating to an identifier of a target application.

15. The protocol of claim 14, characterized in that said information message further includes a field relating to a serial number of the data message exchanged between the application for establishing a chronology of information messages exchanged between said applications.

16. A portable multi-application object comprising input/output means enabling communication with a terminal, processing means connected to the input/output means, a working memory and a programmable nonvolatile memory connected to the information processing means, the nonvolatile memory including a specific memory zone for each application, each specific memory zone being subdivided into a specific memory zone for data, a specific memory zone for instructions; and a specific memory zone for identification that relate to this application, said portable multi-application object further including, in said nonvolatile memory, a communications interface provided with at least one message sending command and one message reception command, which by allocation to a first application of a source application attribute upon request for the first application to send a data message to at least one further application, and respectively by assignment to at least one second application, distinct from said first application, of a target application attribute, permits the exchange of information messages between the source and target applications, via said communications interface, while substantially preventing the risk of interaction between said applications.

* * * * *